United States Patent
Buchanan et al.

(10) Patent No.: US 6,715,597 B1
(45) Date of Patent: Apr. 6, 2004

(54) DUAL CLUTCH TRANSMISSION CLUTCH COOLING CONTROL METHOD

(75) Inventors: Mark Buchanan, Rochester Hills, MI (US); Melissa Koenig, Howell, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/280,775

(22) Filed: Oct. 25, 2002

(51) Int. Cl.$^7$ ............................................. F16D 13/72
(52) U.S. Cl. ................. 192/70.12; 192/113.35
(58) Field of Search .................. 192/70.12, 113.34, 192/113.35

(56) References Cited

U.S. PATENT DOCUMENTS

| | | | |
|---|---|---|---|
| 3,490,312 A | 1/1970 | Seitz et al. .................. 74/711 |
| 3,589,483 A | 6/1971 | Smith ........................ 192/3.52 |
| 4,205,739 A | 6/1980 | Shelby et al. ............... 192/113 |
| 4,270,647 A | 6/1981 | Leber ........................ 192/113 |
| 4,461,188 A | 7/1984 | Fisher ....................... 74/330 |
| 4,513,631 A | 4/1985 | Koivunen .................... 74/360 |
| 4,544,057 A | 10/1985 | Webster et al. ........... 192/0.076 |
| 4,557,363 A | * 12/1985 | Golan ..................... 192/113.36 |
| 4,713,980 A | 12/1987 | Ida et al. ...................... 74/467 |
| 4,753,332 A | * 6/1988 | Bieber et al. ............ 192/70.12 |
| 4,827,784 A | 5/1989 | Muller et al. .................. 74/330 |
| 4,841,803 A | 6/1989 | Hamano et al. ............... 74/665 |
| 5,495,927 A | 3/1996 | Samie et al. ............. 192/70.12 |
| 5,577,588 A | 11/1996 | Raszkowski ............ 192/113.35 |
| 5,613,588 A | 3/1997 | Vu ........................ 192/113.35 |
| 5,662,198 A | 9/1997 | Kojima et al. ............ 192/87.11 |
| 5,711,409 A | 1/1998 | Murata ..................... 192/87.11 |
| 5,720,203 A | 2/1998 | Honda et al. ................. 74/325 |
| 5,755,314 A | 5/1998 | Kanda et al. ............. 192/70.12 |
| 5,890,392 A | 4/1999 | Ludanek et al. .............. 74/331 |
| 5,915,512 A | 6/1999 | Adamis et al. ............. 192/3.61 |
| 5,950,781 A | 9/1999 | Adamis et al. ............. 192/3.61 |
| 5,966,989 A | 10/1999 | Reed, Jr. et al. .............. 74/331 |
| 5,979,257 A | 11/1999 | Lawrie ........................ 74/335 |
| 6,006,620 A | 12/1999 | Lawrie et al. ................ 74/335 |
| 6,012,561 A | 1/2000 | Reed, Jr. et al. ........... 192/48.2 |
| 6,044,719 A | 4/2000 | Reed, Jr. et al. .............. 74/330 |
| 6,286,381 B1 | 9/2001 | Reed, Jr. et al. .............. 74/336 |
| 6,364,809 B1 | 4/2002 | Cherry ........................ 477/86 |
| 6,615,966 B2 * | 9/2003 | Kato ....................... 192/70.12 |
| 6,631,651 B2 * | 10/2003 | Petrzik ........................ 74/346 |

FOREIGN PATENT DOCUMENTS

GB 2 036 203 6/1980

* cited by examiner

*Primary Examiner*—Richard M. Lorence
(74) *Attorney, Agent, or Firm*—Bliss McGlynn, P.C.; Greg Dziegielewski

(57) ABSTRACT

A method of controlling the temperature of the clutches of a dual clutch transmission, which includes the steps of providing a predetermined flow of cooling fluid to at least one clutch of the dual clutch transmission for controlling bulk clutch temperature, monitoring the temperature of the cooling fluid at the clutch, and changing the flow of the cooling fluid to the clutch as a function of a change in the bulk clutch temperature.

20 Claims, 4 Drawing Sheets

DUAL CLUTCH TRANSMISSION CLUTCH COOLING CONTROL METHOD

BACKGROUND OF THE INVENTION

1. Field of the Invention

The present invention relates, generally to a control scheme for cooling a dual clutch transmission as used in motor vehicle driveline and, more specifically, to a method of controlling the flow of cooling fluid provided to each of the two clutches of a dual clutch transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch to engage and disengage the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. The disadvantages of the manual transmission is that there is an interruption in the drive connection during gear shifting and that there is a great deal of required physical interaction on the part of the operator to shift gears.

The second, and newer choice for the transmission of power in a conventional motor vehicle is an automatic transmission. First and foremost, automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween.

More specifically, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel which is generally considered to be unacceptable when compared to smooth shift feel associated with most conventional automatic transmissions.

To overcome this problem, other automated manual type transmissions have been developed which can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular variant types of automated manual transmissions have two clutches and are generally referred to simply as dual, or twin, clutch transmissions. The dual clutch structure is most often coaxially and cooperatively configured so as to derive power input from a singular engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two disc clutches each with their own clutch actuator to control the engagement and disengagement of the two-clutch discs independently. While the clutch actuators may be of the electromechanical type, since a lubrication system within the transmission is still a necessity requiring a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform upshifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions have overcome several drawbacks associated with conventional transmissions and the newer automated manual transmissions, it has been found that controlling and regulating the automatically actuated dual clutch transmission to achieve the desired vehicle occupant comfort goals is a complicated matter. There are a large number of events to properly time and execute within the transmission for each shift to occur smoothly and efficiently. In addition, the clutch and complex gear mechanisms, working within the close confines of the dual clutch transmission case, generate a considerable amount of heat. The heat build-up is aggravated by the nature of the clutch mechanisms themselves, each of which are typically constructed of two series of plates, or discs, one set connected in some manner to the output of the engine and the second attached to an input shaft of the transmission. Each of the set of plates may be covered or impregnated by a friction material. The clutch plates and discs are pressed together under pressure to a point at which the plates and discs make a direct physical connection. The clutch may be designed for a full "lockup" of the plates and discs, or may be designed with a certain amount of "limited slip". Regardless, the slipping of the friction plates within a friction type clutch, whether from a designed limited slip or the normal uncontrolled slipping that occurs during clutch engagement and disengagement, generates heat that needs to be dissipated. A considerable amount of heat can be generated in the typical dual clutch transmission utilizing a combined coaxial clutch assembly wherein the one clutch fits within the second clutch.

In order to provide sufficient cooling to the clutch assemblies of the conventional dual clutch transmission, the clutch assemblies are usually bathed in transmission fluid in a generally uncontrolled manner. While this approach has generally worked for its intended purpose, disadvantages still remain. Specifically, conventional clutch cooling control schemes or methods have either failed to adequately provide for proper cooling and heat reduction of the clutches of the dual clutch transmission or have resulted in producing large efficiency losses by excessively flooding of the clutch assemblies with fluid. Inadequate cooling strategies have led to shortened component life due to damage and ultimate failure of the clutch assemblies within the dual clutch transmission. Similarly, inadequate cooling is responsible for rapid breakdown of the physical properties of the transmission fluid, which can cause failure of the other components within the transmission. The conventional methods of employing a fluid bath or providing a direct uncontrolled flow of cooling fluid to the clutch assembly also cause unnecessary clutch drag and put excessive demands on the pump resulting in poor clutch life and lower fuel efficiencies.

Accordingly, there exists a need in the related art for an improved method of controlling the cooling of the clutch assemblies of the dual clutch transmissions. Specifically, there is a need to provide a method of controlling the delivery and flow of cooling fluid to the clutches in a dual clutch transmission where the structure of the transmission provides for the separate routing and regulation of the transmission fluid to each clutch for independent clutch cooling. In this manner, the uncontrolled and constant fluid flow of conventional cooling approaches, which are excessive and inefficient are avoided, while, at the same time, optimum cooling flow is provided. Such a method properly cools the clutches to prevent component damage, reduces unnecessary clutch drag and reduces excessive demands on the pump, thereby providing for long clutch life and increased fuel economy.

SUMMARY OF THE INVENTION

The disadvantages of the related art are overcome by the method of the present invention for controlling the fluid cooling of the clutches of a dual clutch transmission disposed within a vehicle. More specifically, the method of the present invention controls the temperature of the clutches of a dual clutch transmission and includes the steps of providing a predetermined flow of cooling fluid to at least one clutch of the dual clutch transmission for controlling bulk clutch temperature, monitoring the temperature of the cooling fluid at the clutch, and changing the flow of the cooling fluid to the clutch as a function of a change in the bulk clutch temperature. The method of the present invention has the advantage of providing only the necessary amount of cooling fluid to the clutches without excessively flooding them with cooling fluid, which is inefficient and causes drag and introduces parasitic losses to the components of the dual clutch transmission.

Another advantage of the present invention is provided by the accurate determination of temperature changes to the clutches by monitoring the power transfer across the clutches rather than constantly taking empirical temperature measurements. Thus, another embodiment of the method of the present invention includes the steps of monitoring the input torque applied to the clutches and monitoring the slip across the clutches. The method also determines the change in power transferred across the clutches when either the input torque or slip values changes as well as the change in the bulk clutch temperature of each clutch. In this way, the required change in the flow of cooling fluid to account for the change in the bulk clutch temperatures of each clutch may be determined. The method then determines the available cooling fluid flow from the pump for the current engine speed and proportions the available cooling fluid flow to each of the clutches to account for the change in bulk clutch temperature of each clutch. Thus, each clutch is apportioned the proper amount of the available cooling fluid flow based on its power transfer.

Another advantage is provided by accounting for changes in the bulk clutch temperatures due to the cooling fluid flow provided to the clutches during the prior pass through the method steps of the present invention. Thus, the method of the present invention determines the power transferred across the clutches and determines an initial change in the bulk clutch temperature for each clutch based on the power transferred across each clutch. Then, the method determines a secondary change in the bulk clutch temperatures based on the existing cooling fluid flow to each clutch during the prior pass through the method steps and uses this value to determine a total change in bulk clutch temperature for each clutch by summing the initial change with the secondary change.

Another advantage of the present invention is provided by accounting for changes to the temperature of the cooling fluid itself. By determining the difference between the temperature of the cooling fluid in the sump and the temperature of the cooling fluid leaving the clutches, the method determines an additional required change in the flow of cooling fluid for each clutch based on this temperature difference. The method then uses this temperature difference to determine the total required change in the flow of cooling fluid for each clutch.

In this manner, the method of the present invention overcomes the limitations and drawbacks of the prior art by controlling the cooling of the clutches of a dual clutch transmission and accounting for the changes in the bulk clutch temperatures due to the cooling fluid flow provided to each clutch prior to any change in power transferred across the clutches and by accounting for increases in the temperature of the cooling fluid as the clutches power shift.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
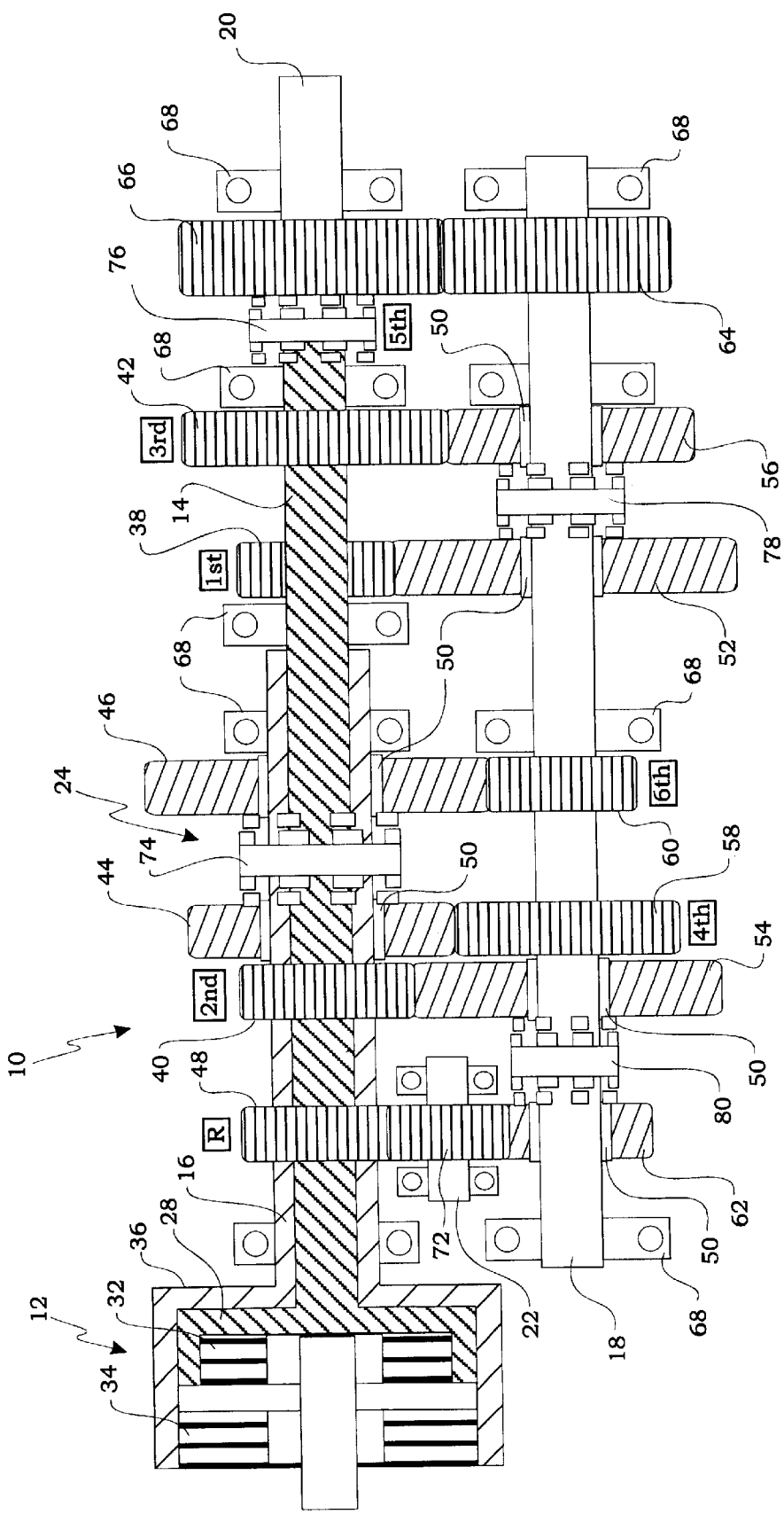
FIG. 1 is a schematic illustration of a dual clutch transmission of the type that may be controlled by the method of the present invention.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, and a plurality of synchronizers, generally indicated at 24.

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators (not shown) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

It should be appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch cooling functions. Thus, the control method of the present invention as described below may be a standalone process or merely a portion, such as a sub-routine, or series of sub-routines, of a larger control scheme within the ECU.

The first and second clutch mechanisms 32 and 34 of the dual, coaxial clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as seen in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is effected. This powershift changeover of the clutches 32 and 34 occurs for each shift change of the dual clutch transmission 10. As the inactive clutch (now the on-coming clutch) is engaged, the load applied causes a surge of power to be transferred across the clutch with an accompanying generation of heat from the slip that occurs across the clutch. The temperature of the on-coming clutch rapidly increases, or spikes, to a point where the clutch plates or the friction material could be damaged if proper cooling is not provided. Additionally, the heat build-up, if not properly dissipated, will greatly increase the overall temperature of the dual clutch transmission 10 and may cause the damaging effects mentioned above. Simultaneously, while the temperature of the on-corning clutch is sharply rising, the disengaging, or off-going, clutch will cease transmitting torque. With the removal of the load the disengaged clutch will stop generating heat, thus sharply lowering its cooling requirement.

Figure 2:
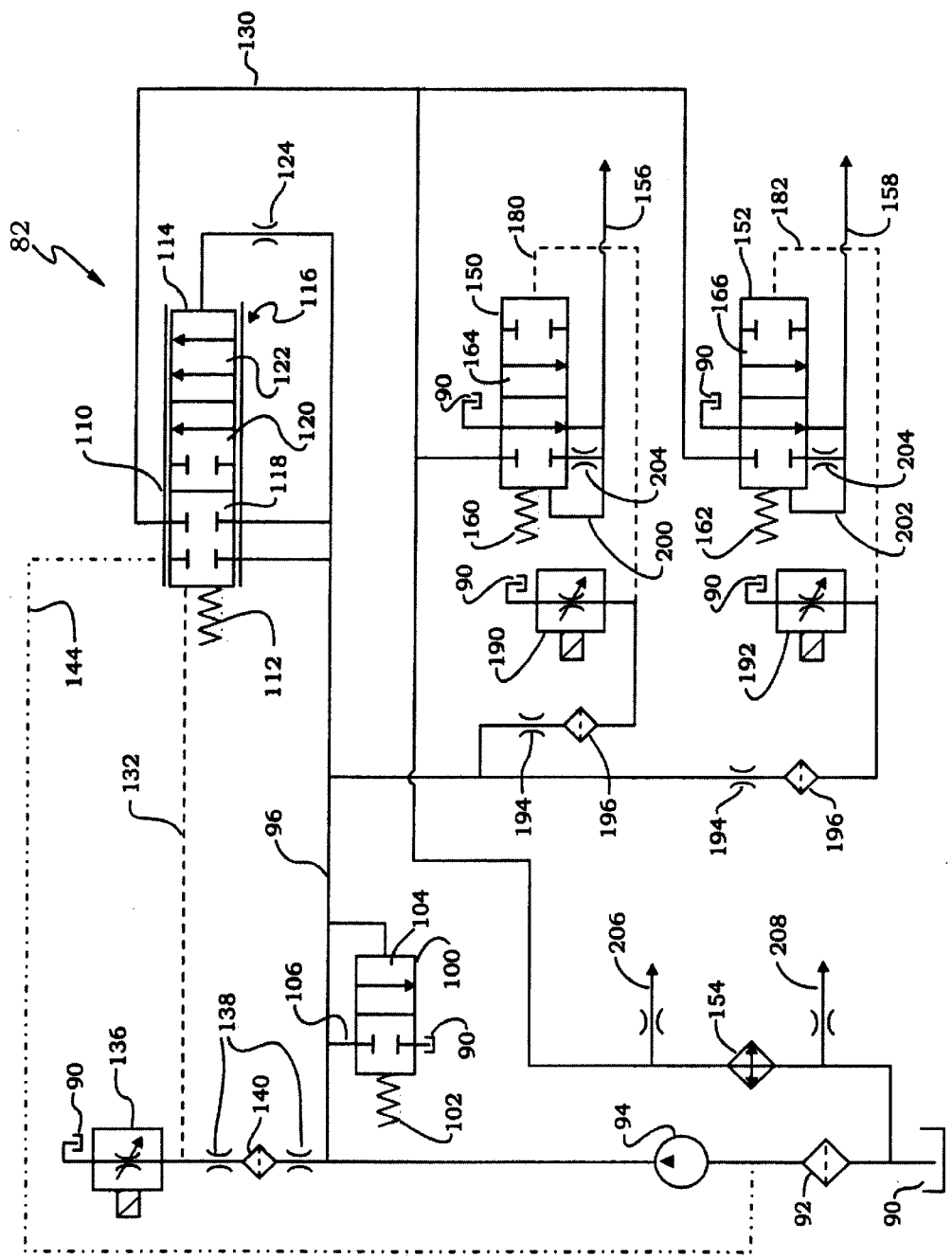
FIG. 2 is a schematic illustration of the electro-hydraulic control circuit for the separate and independent flow of transmission fluid to the clutches of a dual clutch transmission that is controlled by the method of the present invention.

In the preferred embodiment of the dual clutch transmission 10, cooling fluid is delivered individually to the first and second clutch mechanisms 32 and 34. The control of the flow of cooling fluid may be regulated by an electro-hydraulic circuit, as schematically illustrated in FIG. 2. However, those having ordinary skill in the art will appreciate from the following discussion that the actual means of delivering the cooling fluid to the clutch mechanisms 32 and 34 is unimportant and beyond the scope of the invention. Thus, various approaches for delivering fluid to clutch disks and plates, such as internal fluid passages extending through the input shafts or appropriately placed spray orifices as commonly known in the art may be employed in connection with the method of the present invention.

FIG. 2 schematically represents the flow of cooling fluid through a regulating circuit, generally indicated at 82. The bulk of the cooling fluid is maintained in a sump 90. A pump 94 is used to provide positive pressure to the cooling fluid as it is drawn from the sump 90 through a filter 92. The pump output charges a main pressure line 96 that feeds the various components of the regulating circuit 82. A pump pressure relief valve 100 is operatively connected in fluid communication with the main pressure line 96 to provide a maximum upper limit for the positive pressure provided by the pump 94. The pressure relief valve 100 is moved to its closed position, as shown in FIG. 2, by a biasing member 102. The biasing member 102 has a pre-determined spring force that corresponds to the desired maximum system pressure. In the advent that the pressure in the main pressure line 96 exceeds the pre-determined maximum, the excessive pressure, as applied to the right side of the valve, will move the valve member 104 of the pressure relief valve 100 to the left, overcoming the spring force of biasing member 102. In this manner, the previously blocked relief passage 106 is opened to the sump 90 allowing the excessive pressure to bleed off and dropping the pressure in the main pressure line 96 until the biasing member 102 can force the valve member 104 of the relief valve 100 back to its closed position.

The main pressure line 96 also feeds the main pressure regulator 110. The main pressure regulator 110 maintains the pressure in the main pressure line 96 at a pre-determined operating pressure, or setpoint. The main pressure regulator 110 is shown in FIG. 2 in its closed position and includes a biasing member 112 and a main valve member schematically indicated at 114 with internal flow passages, generally indicated at 116. The flow passages 116 are shown in left 118, middle 120, and right 122 positions of the valve member 114. The pressure in the main pressure line 96 is supplied to the right side of the main regulator valve through a flow restrictor 124 that reduces the flow volume but maintains the applied pressure. With the pump 94 operating, the pressure delivered to the right side of the main pressure regulator 110 overcomes the spring force of the biasing member 112 and moves the valve member 114 of the regulator 110 to the right from the closed left position 118 to the middle operable position 120. Here, the internal flow passages 116 of the middle operable position 120 allow the flow of cooling fluid in the main pressure line 96 to flow into the regulated line 130. A regulating control line 132, shown as a dotted line in FIG. 2, provides a controllable biasing force to the left side of the main pressure regulator 110. The regulating control line 132 delivers a portion of the pressure from the main pressure line 96 to the left side of the regulator 110 under the control of the line pressure solenoid 136.

The line pressure solenoid 136 is electrically operated by the ECU to set the regulated pressure setpoint within the regulating circuit 82 and then to maintain the desired pressure by regulating the output pressure to the setpoint. The line pressure solenoid 136 supplies a varying portion of the available main pressure through the regulating line 132 to the main pressure regulator 110 by bleeding off some portion of the main pressure as supplied through flow restrictors 138 and filter 140 to the sump 90. In this manner, the line pressure solenoid 136 sets the desired output pressure setpoint for the main pressure regulator 110. The line pressure solenoid 136 then varies the pressure in the regulating line 132 to maintain the output pressure delivered from the main pressure regulator 110 about the desired output pressure setpoint while accounting for fluctuations in the output pressure due to downstream pressure changes.

The main pressure regulator 110 also provides control over rapid increases, or surges, in the main pressure line 96 that exceeds the immediate correction ability of the line pressure solenoid 136. The right position 122 of the valve member 114 opens additional flow passages 116 that not only allow for the continued flow of fluid through the regulator 110 to the regulated line 130, but also allow a portion of the increased flow to pass to the suction line 144. The suction line 144 normally remains closed off by the left and middle positions 118, 120 of the valve member 114. However, when a sharp or rapid increase of pressure in the main pressure line 96 drives the valve member 114 all the way to the left, a corrective portion of the flow is fed back to the suction side of the pump 94. As the suction line 144 bleeds off the surge of excessive pressure flow, the regulator valve member 114 moves back to the middle operative position 120.

The regulated flow in the line 130 from the main pressure regulator 110 feeds the clutch cooling regulators 150 and 152 and also continues on through the fluid cooler 154 to the sump 90. The cooler 154 may be of any type of fluid cooler designed to dissipate heat and reduce the temperature of the fluid returned to the sump. The cooler 154 may include, but is not limited to, a heat exchanger of the fluid-to-air type as is commonly known in the art. The clutch cooling regulators 150 and 152 are substantially similar. Each provides a controlled flow of cooling fluid to one of the first and second clutches 32 and 34 of the dual clutch transmission 10 through output lines 156 and 158, respectively. The clutch cooling regulators 150 and 152 each respectively include a biasing member 160,162 and a main valve body 164,166 having internal flow passages and a valve member that is moveable between predetermined positions within the valve body 164 to open or close the valve flow passages as is commonly known in the art. The regulator control lines 180 and 182 (shown as a dotted lines) provide an actuating force to the right sides of the clutch cooling regulators 150 and 152. The regulator control lines 180 and 182 deliver a portion of the pressure from the main pressure line 96 under the control of the cooling control solenoids 190 and 192, respectively.

The cooling control solenoids 190 and 192 are electrically operated by the ECU to control the delivery of cooling fluid to each of the clutches independently by regulating the cooling flow through the clutch cooling regulators 150 and 152. Each of the cooling control solenoids 190 and 192 supply a variable portion of the available main pressure through the regulator control lines 180 and 182 to the clutch cooling regulators 150 and 152 by operatively bleeding off some portion of the main pressure through flow restrictors 194 and filters 196 to the sump 90. The pressure supplied to the right side of the clutch cooling control regulators 190 and 192 moves the valve members 164 and 166 to the left to allow the cooling fluid in the regulated line 130 to pass from the output lines 156 and 158 to the clutches 32, 34. Additionally, a small portion of the output pressure in the output line 156 and 158 is routed back through feedback lines 200 and 202 to the left sides of the clutch cooling control regulators 150 and 152. Flow restrictors 204 maintain the applied pressure but reduce the flow through the feedback lines 200 and 202. This pressure feedback assists the biasing members 160 and 162 in returning the valve members 164 and 166 to the closed position when the applied controlling pressure through the regulator control lines 180 and 182 is removed or drops. It should be noted that the regulated line 130 also provides a portion of the pressurized fluid to other parts of the dual clutch transmission 10 at line 206 and 208 for any of a variety of purposes such as cooling and lubrication of additional components.

Figure 3:
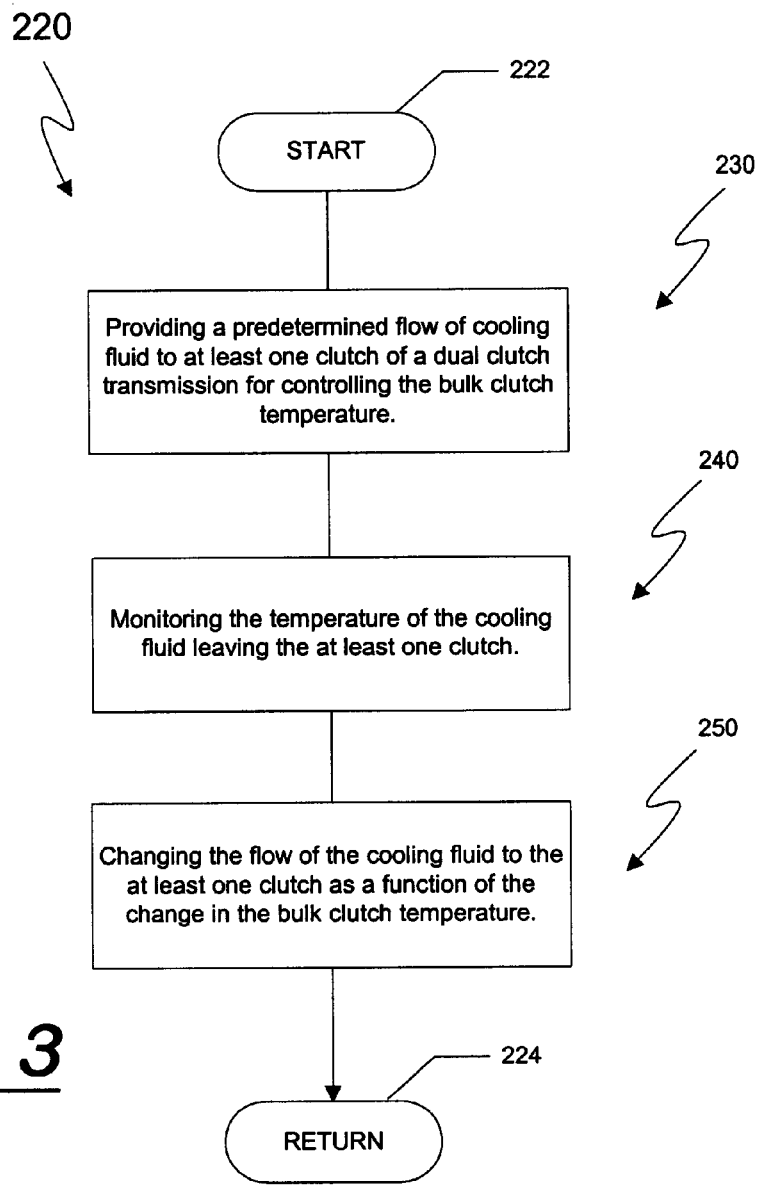
FIG. 3 is a general block diagram flowchart of the method of the present invention for controlling a dual clutch transmission.

The method of the present invention is generally indicated at 220 in FIG. 3 and operatively controls the temperature of the clutches 32 and 34 of the dual clutch transmission 10. The method includes the step of providing a predetermined flow of cooling fluid to at least one of the clutches in the dual clutch transmission 10 for controlling the bulk clutch temperature, as generally indicated at 230. It should be appreciated that the term bulk clutch temperature is understood to mean the overall, or bulk temperature of all the combined components of the clutch assembly as a whole. The method also includes the steps of monitoring the temperature of the cooling fluid leaving the clutch, as generally indicated at 240, and changing the flow of cooling fluid to the clutch as a function of the change in the bulk clutch temperature, as generally indicated at 250.

Figure 3A:
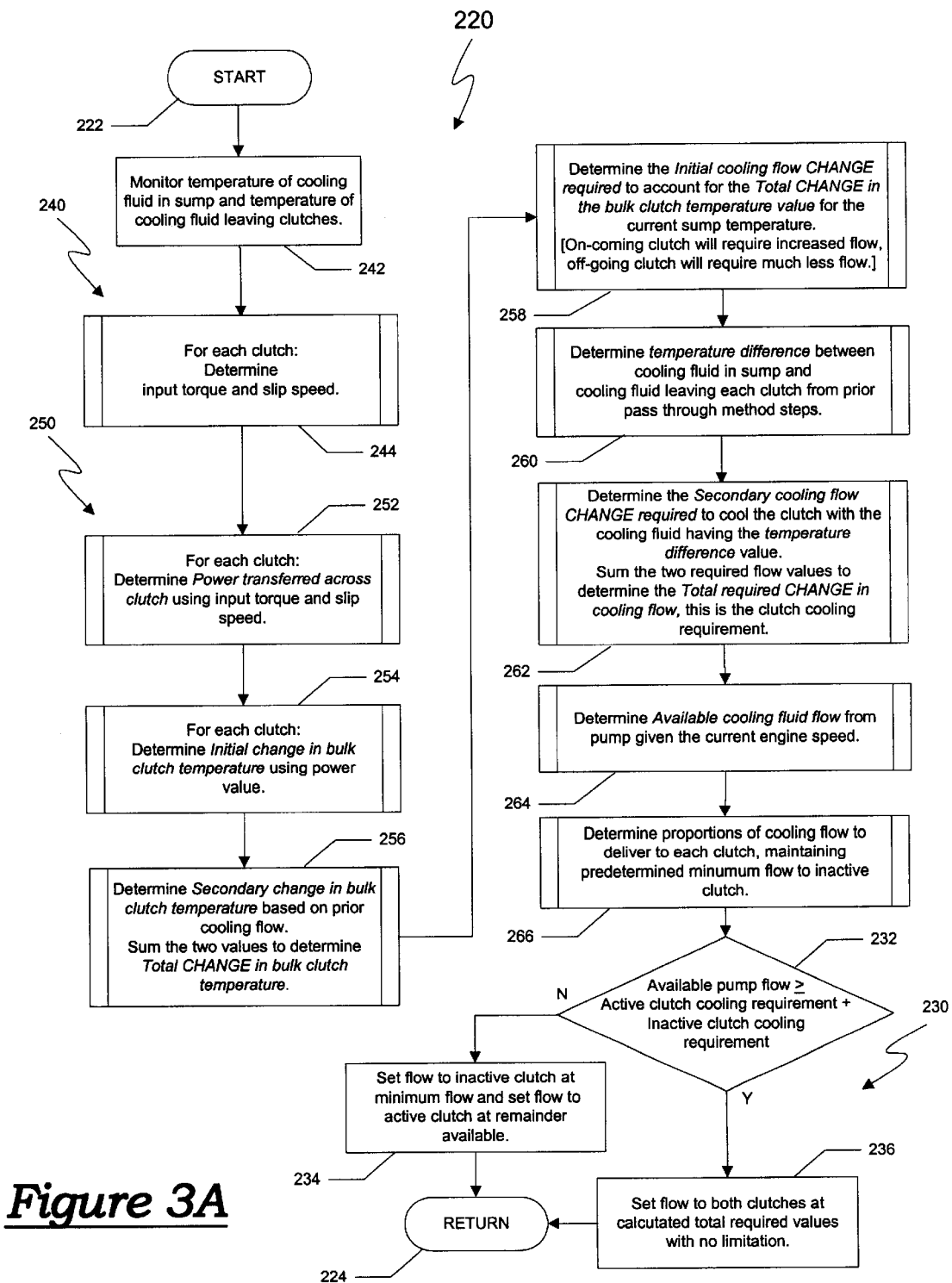
FIG. 3A is a detailed block diagram flowchart of the method of the present invention for controlling a dual clutch transmission.

More specifically, and by way of non-limiting example, the method steps generally indicated in FIG. 3 may include those depicted in detail in FIG. 3A. In this example, through another program or sub-routine within the ECU (that is beyond the scope of this invention), the method 220 is initialized at a starting point 222 to cool the clutches 32 and 34 of the dual clutch transmission 10. The step 240 includes monitoring the temperature of the cooling fluid leaving the clutches 32, 34 as well as the temperature of the cooling fluid in the sump 90 of the transmission 10. This action is indicated in the process block 242. Thereafter, the input torque and slip speed of both clutches 32, 34 are determined as represented at process block 244.

The flow changing portion 250 of the method includes additional steps to provide the required changes to the cooling fluid flow. The flow path proceeds to step 252, which determines the power transferred across the clutches as a function of the input torque and slip speed of the clutches 32, 34. It should be appreciated that the power transfer value may be determined directly by a calculation for input torque and slip speed or may be determined from a stored lookup table within the ECU or other associated storage device.

Once the values for the power transfer are determined, step 254 determines a change in the bulk clutch temperature for each clutch 32, 34 based on the change in power transfer. This is the initial bulk clutch temperature change and is solely dependant on the change in power transfer. Again, it should be appreciated that the values may be taken from lookup tables or calculated directly. Once an initial bulk clutch temperature change is determined at step 254, a secondary bulk clutch temperature change is also determined at step 256. The secondary bulk clutch temperature change is dependant on the cooling fluid flow that was being provided to the clutches 32, 34 during the prior pass through the method steps of the present invention. In other words, in the case of the on-coming clutch, as the clutch plates are engaged, the power transfer rises sharply bringing an associated increase in bulk clutch temperature. At minimum, prior to its engagement, a predetermined minimal flow of cooling fluid is provided to the oncoming clutch. The purpose of the minimal flow is to provide a small but adequate cooling and lubricating flow without flooding the disengaged clutch plates, which would cause unnecessary drag and parasitic losses. However, based on the prior activity of the now oncoming clutch, the existing flow may also be quite high. In any case, at this point in the method steps of the present invention, both the heating due to power transfer and the cooling effect due to prior cooling fluid flow are accounting for and the net effect is determined.

Thus, in the case of the on-coming clutch, the initial change to the bulk clutch temperature will likely be a positive or increase in the temperature. At the same time, the presence of the minimal cooling fluid flow will likely provide a small negative, or cooling effect to the sharp increase in the bulk clutch temperature as it first occurs. Accordingly, it is necessary to determine the value of this cooling effect as a secondary change in bulk clutch temperature at process step 256. The two bulk clutch temperature change values (the initial and secondary) are then summed to arrive at the total change in bulk clutch temperature for the change in power transfer across the clutch. This calculation is performed for both the on-coming and off-going clutches. It should be appreciated that in the case of the off-going clutch, the power transferred across the clutch will be zero. Therefore, the initial bulk clutch temperature of the off-going clutch will be decreasing, indicative of the clutch cooling off as it becomes disengaged. Additionally, the secondary bulk clutch temperature value for the off-going clutch will be determined based on the previously high flow of cooling fluid supplied while engaged, which will now be excessive as the off-going clutch disengages.

The flow path of the method then continues to step 258, where a corresponding change in the required flow of cooling fluid is determined to account for the total change in bulk clutch temperature. In the case of the on-coming clutch, which sees a sharp increase in bulk clutch temperature, the change in the required cooling fluid flow will be an increase to account for the increase in the bulk clutch temperature and to reduce this temperature to a predetermined value. In the case of the off-going clutch, the change in the required cooling fluid flow will be a decrease to account for the decrease in the bulk clutch temperature and to avoid the unnecessary flooding of the disengaged clutch plates. In this way, the method of the present invention is calculated to provide only the amount of cooling fluid flow that is needed in any given situation and no more. Thus, cooling fluid flow is efficiently controlled and managed in the proportions needed so that fluid drag and parasitic losses of efficiency are eliminated.

The desired pre-determined temperature of the on-coming clutch is that of the cooling fluid in the sump 90. Even though the sump temperature varies during the operation of the vehicle, the action of returning the cooling fluid to the sump 90 through the cooler 154, as discussed above, keeps the sump temperature within a range that is considered acceptable for operating the transmission and providing cooling to the various components therein. Thus, the initial required change in the flow of cooling fluid at process step 258 is based on the total change in bulk clutch temperature and the temperature of the cooling fluid in the sump at the time of the change in power transfer. It should be appreciated that while the cooling fluid returning to the sump 90 through the cooler 154 will dissipate the heat taken from the clutches 32, 34, the engagement change-over of the two clutches will impart a surge of heat to the minimal cooling flow passing through the on-coming clutch. This surge of heat in this portion of the cooling fluid will influence the overall temperature of the cooling fluid in the sump 90 and negatively influence the cooling effect of the fluid delivered from the sump.

In order to account for the rapid heat rise in this portion of the cooling fluid flow, the method process continues to step 260, which first determines the temperature difference between the cooling fluid in the sump 90 and the temperature of the cooling fluid leaving each of the clutches 32 and 34. Then, step 262 determines an additional required change in the flow of the cooling fluid based on this difference. The additional flow of cooling fluid reflects the lessened ability of the cooling fluid to dissipate the increase in bulk clutch temperature and represents an additional amount of cooling fluid flow necessary to compensate for the rise in the cooling fluid temperature. The additional required change in the flow of the cooling fluid is summed together with previously determined initial required change in the flow of cooling fluid from step 258 to yield a total required change to the flow of cooling fluid for each clutch. This total required change to the flow of cooling fluid to each clutch, whether it be an increase or decrease, is known as the clutch cooling requirement.

It should be appreciated that in the case of the off-going clutch, as discussed above, the power transfer will be a decreasing value or zero, such that the relative change in bulk clutch temperature will be decreasing, indicative of the clutch cooling off as it becomes disengaged. The secondary change in bulk clutch temperature value for the off-going clutch will also be decreasing since it is based on the previously high flow of cooling fluid supplied while the clutch was engaged. In other words, the cooling fluid flow in the off-going clutch will be excessive as it disengages and the total required cooling flow change determined in step 262 will be a negative number meaning a flow reduction is required.

Now that the clutch cooling requirement for each clutch has been determined, the method determines if the pump 94 can provide the needed changes to the flow at its current output. Thus, process block 264 determines the available cooling fluid flow out of the pump 94 for the given engine speed. The fluid flow generated by the pump 94 varies as the engine speed changes, due to the mechanically driven nature of the pump. The pump output increases as the engine speed increases. With the available flow known, process block 266 begins the determination of how to apportion the flow to the two clutches while maintaining a predetermined minimal cooling fluid flow to the off-going, and now inactive, clutch. It should be appreciated that during the shift change, as the off-going clutch becomes the inactive clutch it may temporarily need a level of flow above the predetermined minimal cooling flow to cool down prior to reaching a temperature for which the predetermined minimal flow is adequate. This precludes the instantaneous setting of the flow to the off-going clutch to the predetermined minimum flow. It should be further appreciated that during the shift change the engine speed will first fall offbut gradually increase providing an increasing amount of cooling fluid flow from the pump 94.

Decision block 232 compares the currently available flow from the pump 94 to the previously determined clutch cooling requirements of both clutches and checks to see if the available flow exceeds the combined clutch cooling requirements of the active and inactive clutches. If it does, the "YES" path is followed to process block 236, which changes the quantity of flow to both clutches to the above-determined clutch cooling requirements with no low limitation to either clutch. If the available flow does not exceed the requirements of both clutches, the "NO" path is followed to process block 234, which sets the flow of cooling fluid to the inactive clutch at the predetermined minimum flow and allows the remainder of the flow to pass to the active clutch. Then the method repeats itselfthrough the return at 224, which brings the method back to the start block 222. It should be appreciated that the process is cyclical and that the cooling fluid flow is constantly being re-apportioned as the engine speed, and thus the input torque, varies across the clutches and the dual clutch transmission 10 shifts gears.

Thus, the method of the present invention provides for the control of the flow of cooling fluid to each of the two clutches of a dual clutch transmission 10 The method includes monitoring of the power transferred across the clutches to optimally vary the cooling flow to overcome the disadvantages of conventional cooling methods. The present invention provides a reduced cooling fluid flow to the inactive clutch avoiding the fluid drag, parasitic losses, and inefficiencies-of conventional clutch cooling methods while providing increased flow to the active clutch relative to its power load to properly protect the clutch and its components from damage and providing efficient cooling.

The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of controlling the temperature of the clutches of a dual clutch transmission, said method including the steps of:

provided a predetermined flow of cooling fluid to at least one clutch of the dual clutch transmission for controlling bulk clutch temperature;

monitoring the temperature of the cooling fluid at the clutch; and changing the flow of the cooling fluid to the clutch as a function of a change in the bulk clutch temperature.

2. A method as set forth in claim 1 wherein the method step of monitoring the temperature of the cooling fluid provided to the clutch of a dual clutch transmission further includes the steps of:

monitoring the input torque applied to the clutch;

monitoring the slip across the clutch;

determining the change in power transferred across the clutch when either the input torque or slip values change; and determining the change in bulk clutch temperature of the clutch.

3. A method as set forth in claim 2 wherein the step of determining the change in power transferred across at least one clutch when the input torque and slip values change includes identifying the value of the power transferred from a stored lookup table.

4. A method as set forth in claim 2 wherein the step of determining the change in bulk clutch temperature includes determining an initial change and determining a secondary change in bulk clutch temperature.

5. A method as set forth in claim 4 wherein the step of determining an initial change to the bulk clutch temperature is based on the change in power transferred across the clutch.

6. A method set forth in claim 5 wherein the step of determining an initial change in the bulk clutch temperature includes identifying the value of the change in power transferred across the clutch from a stored lookup table.

7. A method as set forth in claim 4 wherein the step of determining a secondary change in bulk clutch temperature includes calculating this change based on the existing cooling fluid flow to the clutch prior to the change in power transferred.

8. A method as set forth in claim 7 wherein the step of determining a secondary change in bulk clutch temperature includes identifying the value of the existing cooling fluid flow to the clutch prior to the change in power transferred from a stored lookup table.

9. A method as set forth in claim 4 wherein the step of determining the change in bulk clutch temperature further includes determining a total change in bulk clutch temperature by summing said initial change in bulk clutch temperature with said secondary change in bulk clutch temperature.

10. A method as set forth in claim 1 wherein the step of changing the flow of the cooling fluid to the clutch as a function of a change in the bulk clutch temperature includes increasing the flow of cooling fluid to the clutch.

11. A method as set forth in claim 1 wherein the step of changing the flow of the cooling fluid to the clutch as a function of a change in the bulk clutch temperature includes decreasing the flow of cooling fluid to the clutch.

12. A method as set forth in claim 1 wherein the step of changing the flow of the cooling fluid to the clutch as a function of a change in the bulk clutch temperature includes determining an initial required change in the flow of cooling fluid and determining an additional required change in the flow of cooling fluid to account for the change in bulk clutch temperature.

13. A method as set forth in claim 12 wherein the step of determining an additional required change in the flow of cooling fluid to account for the change in bulk clutch temperature further includes the steps of:

monitoring the temperature of the cooling fluid leaving the clutch;

monitoring the temperature of the cooling fluid in the sump;

determining the difference between the temperature of the cooling fluid in the sump and the temperature of the cooling fluid leaving the clutch; and determining the additional required change in the flow of cooling fluid based on said temperature difference between the temperature of the cooling fluid in the sump and the temperature of the cooling fluid leaving the clutch.

14. A method as set forth in claim 12 wherein the step of determining the change in the flow of cooling fluid required to account for the change in bulk clutch temperature includes summing said initial required change and said additional required change in the flow of cooling fluid.

15. A method of controlling the temperature of the clutches of a dual clutch transmission, said method including the steps of:

monitoring the input torque applied to the clutches;

monitoring the slip across the clutches;

determining the change in power transferred across the clutches when either the input torque or slip values change; and determining the change in the bulk clutch temperature of each clutch;

determining the required change in the flow of cooling fluid to account for the change in the bulk clutch temperatures of each clutch;

determining the available cooling fluid flow from the pump for the current engine speed; and proportioning the available cooling fluid flow to each of the clutches to account for the change in bulk clutch temperature of each clutch.

16. A method as set forth in claim 15 wherein the step of determining the change in bulk clutch temperature of each clutch includes determining an initial change based on said change in power transfer across the clutch and determining a secondary change based on the existing cooling fluid flow to the clutch prior to the change in power transfer.

17. A method as set forth in claim 16 wherein the step of determining the change in bulk clutch temperature of each clutch further includes summing the value of the initial change in bulk clutch temperature with the secondary change in bulk clutch temperature to determine a total change in clutch bulk clutch temperature for each clutch.

18. A method as set forth in claim 15 wherein the step of determining the change in the flow of cooling fluid required to account for the change in the bulk clutch temperature of each clutch further includes the steps of:

monitoring the temperature of the cooling fluid leaving each clutch;

monitoring the temperature of the cooling fluid in the sump of the transmission;

determining the difference between the temperature of the cooling fluid in the sump and the temperature of the cooling fluid leaving each of the clutches; and determining an additional required cooling fluid flow for each clutch based on the temperature difference of the cooling fluid leaving each clutch and the temperature of the cooling fluid in the sump.

19. A method as set forth in claim 15 wherein the step of proportioning the available cooling fluid flow to each of the clutches to account for the change in bulk clutch temperature of each clutch further includes the steps of:

determining a total required change in the flow of cooling fluid by summing the value of the required change in the flow of cooling fluid to account for the change in the bulk clutch temperature in the active clutch with the value of the required change in the flow of cooling fluid to account for the change in the bulk clutch temperature in the inactive clutch;

comparing the total required change in the flow of cooling fluid to the available cooling flow from the pump;

changing the flow of cooling fluid delivered to the active clutch by the value of the required change in the flow of cooling fluid and changing the flow of cooling fluid delivered to the inactive clutch by the value of the required change when the available cooling fluid flow from the pump exceeds said determined total required change in flow; and changing the flow of cooling fluid delivered to the inactive clutch to a predetermined minimum flow value and changing the flow of cooling fluid delivered to the active clutch to the remainder of the available cooling fluid flow when the sum of the two values exceeds the available flow from the pump.

20. A method of controlling the temperature of the clutches of a dual clutch transmission, said method includes the steps of:

monitoring the temperature of the cooling fluid leaving the clutches;

monitoring the temperature of the cooling fluid in the sump of the transmission;

monitoring the input torque applied to the clutches;

monitoring the slip across the clutches;

determining the change in power transferred across the clutches when either the input torque or slip values change;

determining an initial change in the bulk clutch temperature for each clutch based on the change in power transferred each clutch;

determining a secondary change in the bulk clutch temperatures based on the existing cooling fluid flow to each clutch prior to the change in power transferred;

determining a total change in bulk clutch temperature for each clutch by summing the value of the initial change with the value of the secondary change in bulk clutch temperature;

determining an initial required change in the flow of cooling fluid to each clutch to account for the total bulk clutch temperature;

determining the difference between the temperature of the cooling fluid in the sump and the temperature of the cooling fluid leaving the clutches;

determining an additional required change in the flow of cooling fluid for each clutch based on the temperature difference between the temperature of the cooling fluid in the sump and the temperature of the cooling fluid leaving the clutches;

determining the total required change in the flow of cooling fluid for each clutch by summing the value of the initial required change with the value of the additional required change in the flow of cooling fluid;

determining the available cooling fluid flow from the pump for the current engine speed; and proportioning the available cooling fluid flow to each of the clutches in relation to the total required change in the flow of cooling flow to account for the change in bulk clutch temperatures for each clutch.

* * * * *